Jan. 16, 1951 A. O. TOMEK ET AL 2,538,340
SAND SCRUBBING DEVICE AND METHOD
Filed Nov. 14, 1945 4 Sheets-Sheet 3

INVENTORS
Arthur O. Tomek
and
Gerard A. Rohlich
Albert H. Kirchner
ATTORNEY

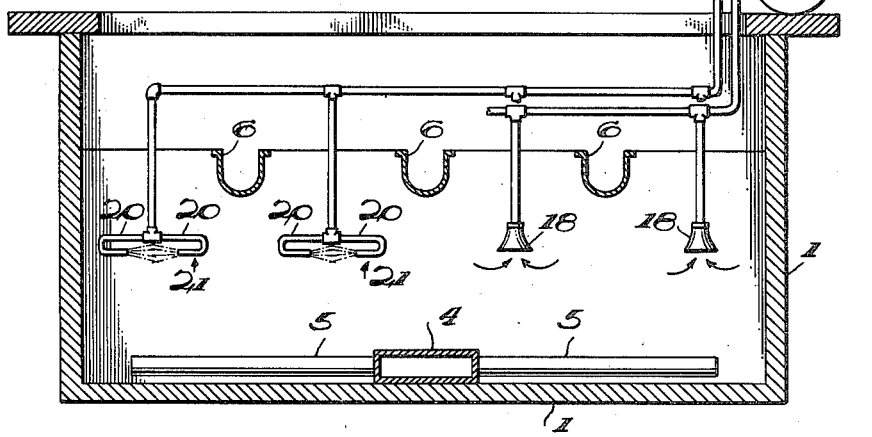
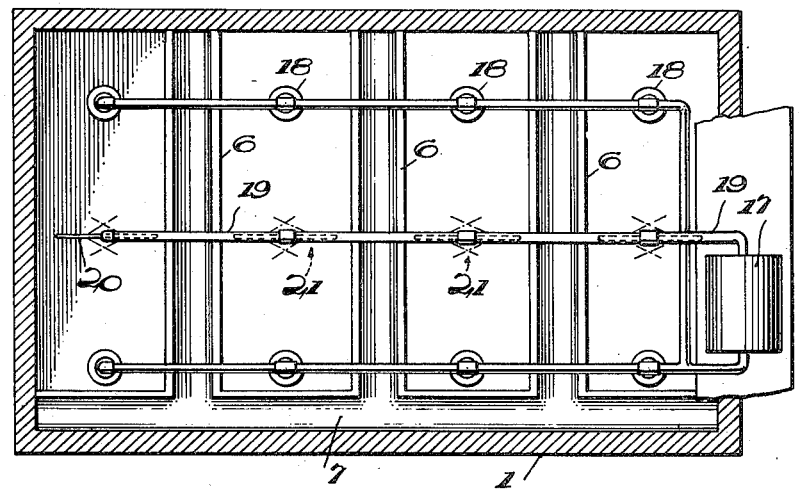

Patented Jan. 16, 1951

2,538,340

UNITED STATES PATENT OFFICE 2,538,340

SAND SCRUBBING DEVICE AND METHOD

Arthur O. Tomek, Hyattsville, Md., and Gerard A. Rohlich, State College, Pa.

Application November 14, 1945, Serial No. 628,466

8 Claims. (Cl. 210—128)

The present invention relates generally to sand scrubbing and more particularly to a method and apparatus for removing from a filter bed of loose granular material the precipitated impurities that have been separated from the liquid undergoing filtration and have collected on and in the filter bed.

The method and apparatus are intended especially to be used in the periodically necessary cleaning of such filter beds as are commonly used in water purification processes, both gravity and pressure types, but the principles of the invention are essentially of considerably broader application and may be utilized in the exact form herein disclosed, or in other forms within the scope of the appended claims, to perform any type of operation which presents the problem of cleaning sand or analogous granular material suspended in water or some other liquid medium.

For the purpose of explaining the invention in one highly useful form of embodiment for which it is admirably adapted it will be described in terms of its incorporation and use in a conventional type of water purifying installation which is at present widely used in the processing of household water in cities and other communities.

Such installations include a filtering tank containing a bed of sand superposed on a body of gravel. Water which has as a rule been given a preliminary coagulating and/or settling treatment is fed to the upper zone of such a tank and percolates by gravity or pressure down through the filtering medium to an underdrain system at the bottom, whence it is led off to a filtered water storage tank or clear well reservoir, leaving impurities consisting of mud, dirt and other solid, filterable particles spread on the top surface of the sand bed and dispersed for an appreciable depth through the sand.

The accumulated impurities retard the flow of the water which is being filtered and lower the rate of production and the quality of the filtrate, and it is necessary from time to time to clean the filter bed. This involves removing the layer of impurities which overlies the surface of the filter bed, separating other impurities from the interstices or voids between the sand granules in which they have been trapped, washing still other impurities from the sand granules on which they have been deposited as a surface coating, and disintegrating and removing "mud balls," which are small bodies of clay, mud or like material cohering in individual lumps.

It has been the practice to clean filter beds by backwashing, i. e., by reversing the flow so that water enters the bed from the underdrain system which is normally the outlet for the filtrate and passes up through the bed and out by way of overflow troughs positioned above the bed. Such flow is effective to remove some of the collected impurities, which are carried out to waste by the water flowing from the troughs, but it does not remove all the impurities. For example, it has very little effect in stripping the sand grains of their surface coatings, and it does not to any appreciable extent remove the mud balls, which are in most cases too heavy to be carried up to the overflow troughs.

It has heretofore been proposed to promote the cleaning efficiency of the backwash by directing streams of sand suspended in water against baffles or deflectors so that the force of the blow would shake surface deposit from the grains and would tend to break up the mud balls. This expedient has met with some success, but it has left much to be desired. It is wasteful of wash water, it has not functioned to clean substantially all the sand grains or break up substantially all the mud balls unless operated for unduly long periods of time, thus increasing the consumption of wash water, and it has required frequent servicing and replacement of the baffles or deflectors as they become worn and damaged or destroyed by the cutting action of the sand grains.

The present invention aims to eliminate all these defects by providing sand scrubbing means which will be more effective for its intended purpose and more efficient, economical and rapid in its operation than the best prior art scrubbing means.

Generally speaking, this is accomplished by arranging sand scrubbing streams for operation without deflectors, baffles or other abutment surfaces, thus eliminating completely the wear, maintenance and replacement of these elements, while at the same time so manipulating the streams that they will be effective to dislodge entrapped impurities, strip the sand grains of their surface coatings, and disintegrate mud balls, flushing all the resulting separated impurities out with the wash water in much less time and at the expense of much less wash water than was possible with the best of the prior art methods or devices.

Incidental advantages of the invention are its low cost of construction and installation, as well as of operation and maintenance, and the fact that it can be installed in an existing filter plant with no interruption of the filtering operation.

Other objects, advantages and modes of use of the principles of the invention will, it is believed, become apparent to those skilled in the art from the more detailed description of those principles which will now be given.

Certain preferred forms of embodiment of the invention are shown on the accompanying drawings and will now be explained in detail.

In the drawings,

Fig. 6 is a vertical cross sectional view of a filter tank or chamber showing a further modified type of unit; and Fig. 7 is a plan view of a filter tank or chamber, partly in horizontal section, showing the installation depicted in Fig. 6.

Figure 1:
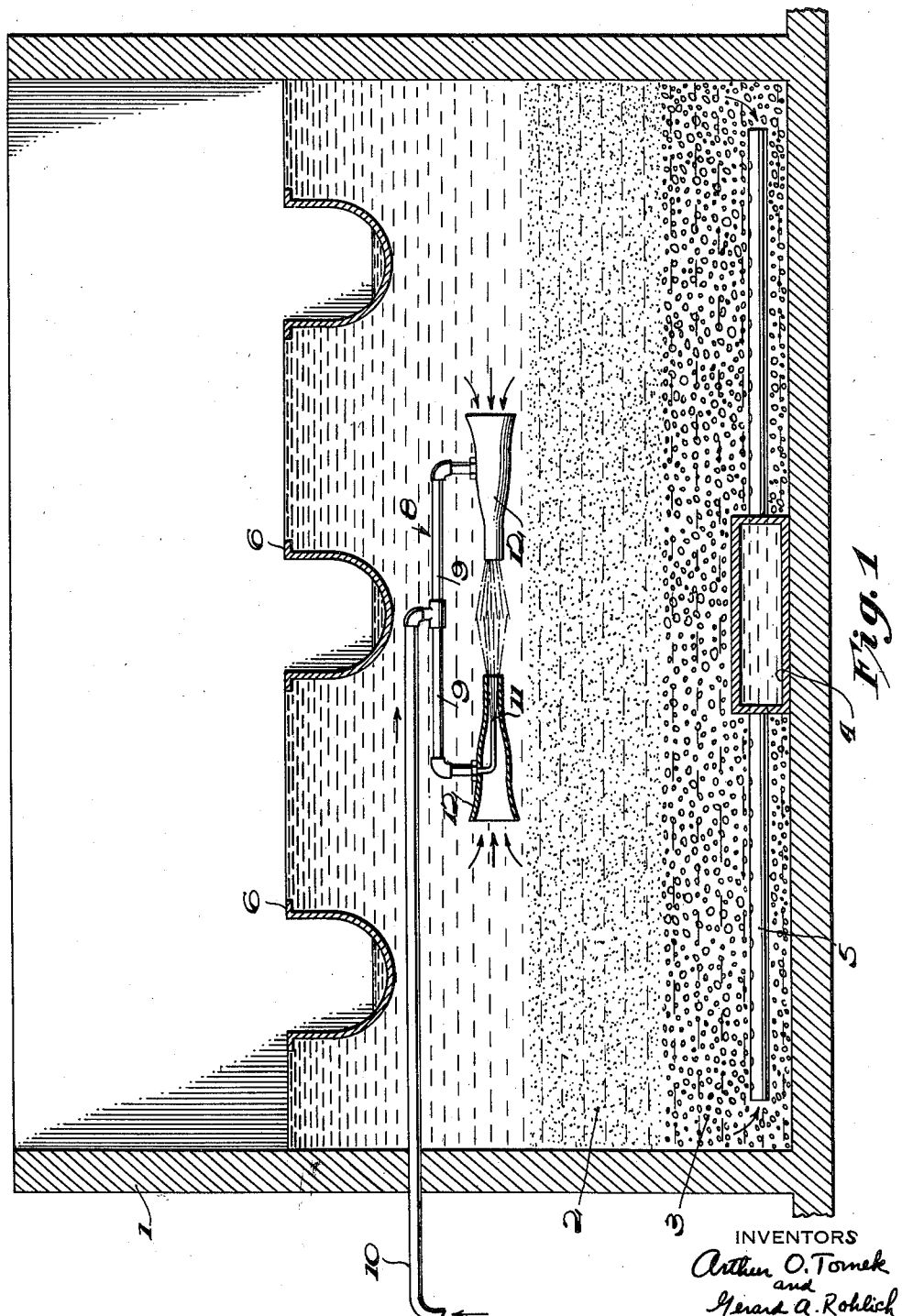
Figure 1 is a vertical sectional view through a filter tank or chamber showing one form of unit provided by the present invention, with the unit and filter bed in the relative positions which they occupy during normal filtering operations, but with the unit shown in operation.

In these drawings the reference numeral 1 designates any suitable tank or basin containing a filter bed comprising a layer of loose sand 2 superposed on a layer 3 of coarser material such as gravel. In the bottom of the tank there is positioned an underdrain system including a central header 4 from which extend a plurality of collecting drain pipes 5, two of which are shown in each of Figs. 1 and 6. These pipes are provided with openings at their ends and with a series of perforations in their side walls for admission of water that has been filtered by passing down through the sand and gravel from inlet pipes (not shown) arranged to discharge into the upper zone of the tank. The header 4 leads to a filtered water storage tank or clear well reservoir. The normal level of the sand bed 2 during filtering is approximately as shown in Fig. 1, although the drawing is not otherwise intended to show the various elements in their true proportions. Above this normal sand level a series of overflow or wash water troughs 6 are mounted as branches of a main collecting trough 7 (Fig. 7) leading to waste, and during the filtering operation water to be filtered more or less fills the space between the normal sand level and the lips of the troughs 6, as shown in Fig. 1. All of this construction is conventional and standard and forms no part of the present invention.

It will be understood that after a period of filtering, impurities collect as a layer on top of the sand bed 2 and penetrate more or less deeply into the sand bed. Some of the impurities adhere as a coating on the individual grains of sand, and others cohere to form the small lumps known as mud balls. It is standard practice to attempt periodically to rid the filter of these impurities by backwashing. In this operation the inflow of water into the upper zone of the tank is stopped, and water is introduced instead through the underdrain system 4, 5. This water flows up through the gravel and sand beds and raises the normal sand level some nine inches, more or less, by expansion of the sand in the bed 2 resulting from suspension of much of it in the upflowing water. A portion of the mud and other impurities is thus separated from its previous position in the layer and in the voids and is carried up by the rising water until it spills with the water into the troughs 6 whence it is discharged as waste. This action has little effect, however, on the deposits of impurities which coat the individual grains of sand, because of the tenacity with which these deposits adhere to the grains, nor is it effective to remove any appreciable portion of the mud balls, since most of these are too heavy to be carried up to the troughs by water backflowing sufficiently slowly to keep the sand grains from rising to the trough lips.

Our present invention provides a method and means of stripping the coatings from the sand grains and of disintegrating the mud balls so that the impurities from these two sources are separated and become suspended in finely divided form in the up-flowing water and are carried off quickly to the troughs.

One form of construction embodying the principles of our invention is shown in Fig. 1. It comprises a unit, generally designated 8, for producing, in the suspension of sand, mud balls, etc., caused by expanding the sand bed by backflow of wash water, a plurality of streams or jets of water and suspended material, and for directing these jets oppositely toward each other so that they will collide and the particles in suspension in one jet will strike against the particles suspended in another jet. In this way the sand grains have their surface deposits rubbed or struck off, and the mud balls are broken up. The separated impurities become suspended in the backflowing water and are promptly carried by it up to the troughs 6.

The unit 8 shown in Fig. 1 includes a pair of branch pipes 9, 9, supplied by a feed pipe 10 with water, air, steam or other suitable fluid under pressure from any appropriate source (not shown). The branch pipes terminate in nozzles or openings 11 which direct their issuing jets oppositely toward each other, preferably directly oppositely toward each other, as shown at 8 in Figs. 1, 3, 4 and 5. These jets entrain water from the tank 1, along with material held in suspension in that water, and the suspended material of each jet impinges against material suspended in the oppositely directed jet with sufficient force to break up the mud balls and to cause the sand grains to rub or strike each other in such a way that their surface coatings are scoured off. For this purpose the nozzles or openings must be set sufficiently close together to cause the jets to strike each other with enough force to accomplish the disintegrating and scouring function. This is a distance which will vary with the character and pressure of the fluid supplied by the pipe 10, the cross sectional area of the nozzle openings, the character of the impurities expected to be encountered, and other factors, and is readily determined by experiment.

The unit 8 is of the aspirating type, a construction which we prefer. It includes a tubular shell 12 surrounding the nozzle or opening of each branch 9, open at its front and rear ends, and best made tapering from rear to front. In the illustrated embodiments of the invention, the shells are straight, having longitudinal axes which are straight lines, but they may be made right angular or otherwise bent or curved, with their rear ends opening downwardly. Jets directed out through the front ends of these tubes aspirate water and suspended solids in through their rear ends and project the suspension out through their front ends, both as an entrainment in the jets themselves and in a conical stream surrounding each jet. The use of the shells 12 appreciably increases the capacity of the jets to propel the suspended matter, but these shells may be dispensed with, at some loss in efficiency, or the suspended matter itself may be pumped directly through the nozzles or branch pipe openings, as will be explained hereinafter. The principles of the invention are satisfied as long as streams of suspended matter are directed oppositely, or substantially oppositely, at each other so as to cause the solids in one stream to strike the solids in the other, or another, stream with sufficient force to break up the impurities to such a degree of fineness that the rising backwash water will carry them up over the lips of the troughs 6.

The operation of the unit 8, in the tank 1, is as follows:

Normally the level of the sand bed 2 is as shown in Fig. 1, with the unit 8 positioned just above the level of the sand. In this position of the parts the filtering operation is conducted in the usual way, as has been explained, with no interference from the unit 8. When the bed is to be cleaned, after an accumulation of mud and other impurities, the inflow of water into the upper zone of the tank is halted and water is introduced through the underdrain system 4 and 5 at a sufficient rate to expand the sand bed 2 enough to elevate the level of that bed to cover the tops of the tubular shells 12. With the parts made in preferred proportions, this expansion will amount to some three inches, more or less. At the same time fluid, such as water, air or steam, is introduced under pressure through the pipe 10 and issues through the nozzles or openings 11 in the branches 9. This aspirates sand and other suspended solids through the shells 12 as indicated by the arrows in Fig. 1, and the two jets of suspended matter impinge against each other as indicated in the figure. This operation may be continued for about one minute; then the fluid flowing through the pipe 10 may be shut off and the backwash from the underdrain system continued for another minute, preferably at an increased rate of speed. During this operation the impurities that were finely divided by the impingement of the jets on each other are carried in suspension by the backwashing water into the trough 6 and thence out to waste.

If it be found at the end of this operation that all the impurities have not been removed, the cycle may be repeated, as by reducing the backwash pressure just enough to keep the sand bed expanded up over the shells 12, then operating the unit for about a minute, followed by full backwashing with the unit inoperative as before.

This cycle may again be repeated, if necessary, until the bed is thoroughly cleaned and the water passing into the troughs 6 is quite clear. The filter may be promptly restored to normal operation by connecting the underdrain system to the filtered water storage tank or clear well reservoir and resuming introduction of water to be filtered through the supply pipes in the upper zone of the tank.

Fig. 1 is largely diagrammatic and shows a preferred form of construction mounted as a single unit in a tank. Actually, in a tank of any appreciable size, a plurality of such units are mounted. They may be arranged in fairly uniformly spaced relation throughout the area of the tank, and they may be provided with different numbers of branch pipes and nozzles or openings, depending on the volume of impurities that must be removed from various areas of the bed.

Figure 2:
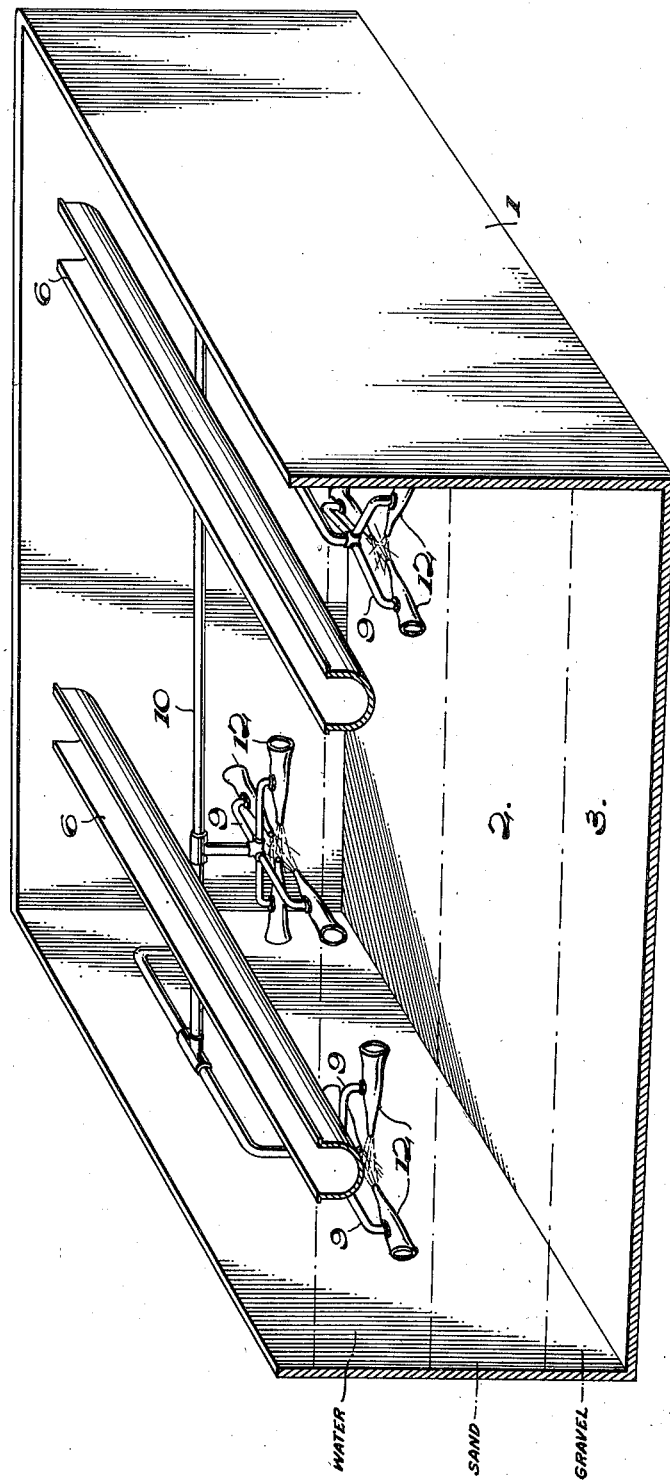
Fig. 2 is a perspective view of a filter tank or chamber showing an installation of modified types of units.
Figure 3:
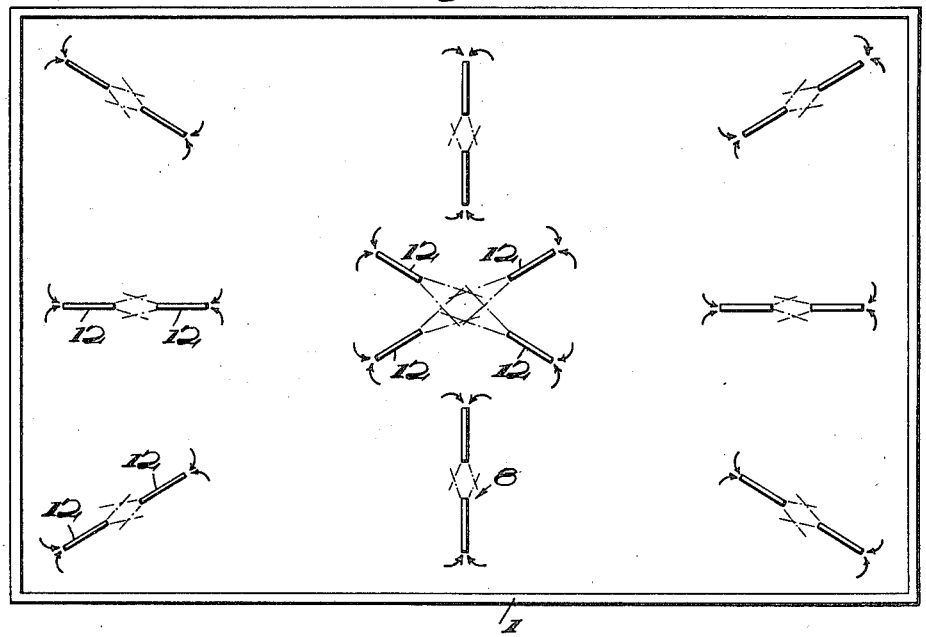
Fig. 3 is a diagrammatic plan view of a filter tank or chamber showing a preferred arrangement of a plurality of units of different types.

Thus, Fig. 2 shows a portion of a tank in which three-nozzle units are mounted along the sides and one or more four-nozzle units are mounted along the center zone of the tank. Fig. 3 shows two-nozzle units disposed around the side and end zones of a tank, with a single four-nozzle unit in the center of area of the tank.

These arrangements are suggestive merely; others will occur to filtration engineers, and all are within the scope of the invention as long as they involve directing jets or streams of solids in suspension substantially oppositely against each other.

Since the suspended matter in the streams is not directed against any solid abutment surface, there is no such element to wear out or require replacement. The shells 12 undergo some rubbing action by the sand, as do also to a lesser degree those portions of the branch pipes 9 which are encased in the shells. These elements can be made of appropriate abrasion resistant metal or the like, to minimize wear and the necessity for replacement. In order to facilitate inspection and replacement, the units are best made removable from their normally submerged position in the tank by some such arrangements as those shown in Figs. 4 and 5.

Figure 4:
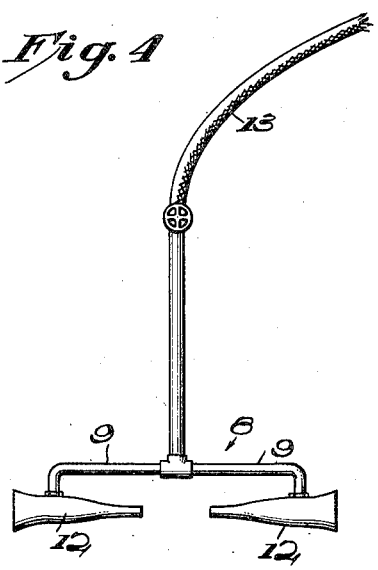
Fig. 4 is a detail view showing in side elevation one form of unit arranged for ready movement to and withdrawal from operative position.

In Fig. 4 each unit is connected by a flexible pipe or tube 13 to the main supply pipe 10. The flexibility of this tube 13 permits the unit to be lifted out of the water and to be thrust back into the water where it can be held in place by any convenient type of clamping means.

Figure 5:
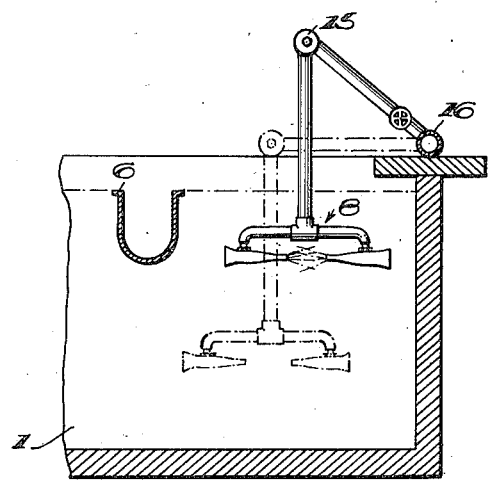
Fig. 5 is a detail vertical sectional view of a portion of a filter tank or chamber showing another type of removable unit.

In Fig. 5 the unit 8 is articulated by means of a rotatable coupling 15 to a short branch of a rotatable main 16 so that the unit can be raised and lowered as indicated by the dotted and full lines in the figure.

As thus far explained, the streams of suspended matter which impinge against each other are formed directly in the sand bed of the filter; that is to say, the material in the sand bed is entrained in or aspirated by the fluid jets from points immediately adjacent to the jets. However, the streams of suspended material may, if desired, be formed otherwise, within the broad spirit of the invention, as by drawing suspended material from certain portions of the filter bed and projecting it in the form of colliding streams or jets in some other portion of the filter bed, or even elsewhere, outside of the tank.

One such type of arrangement is shown in Figs. 6 and 7. In this construction a pump 17, preferably one of the self-priming type, is located outside of the tank 1 and withdraws suspended material from the tank through a series of branch inlets 18. The material is delivered by the pump through a discharge pipe 19 to a number of sets of branch pipes 20 forming units 21 each including at least two nozzles or openings for directing jets or streams of suspended material from the branches 20 oppositely toward each other for the purpose hereinabove fully explained. These units 21 may be arranged along the center of a filter bed, with intakes 18 arranged along both sides, as shown in Fig. 7. Each intake may be provided with a valve accessible from without the tank so that inflow may be controlled at the several intakes, thus making it possible to vary the cleaning effect of the installation in accordance with the necessity for cleaning at different portions of the filter bed.

The units 21 are shown in Figs. 6 and 7 located in the tank, like the units 8 in the other figures. This is the preferred location because jets produced here will entrain matter suspended in the surrounding water and will thus produce an increased scouring effect. Moreover, impurities disintegrated in or just above the filter bed are easily removed by backwashing, while the sand grains in the streams or jets fall back into the bed.

However, it will be evident that the units 21 might be located outside of the tank 1. The water from the jets or streams issuing from the units could be conducted off with the suspended impurities, and the sand could subsequently be removed to a storage pile or conducted back to the filter bed in the tank.

In the foregoing explanation the terms "sand" and "water" are used generically, as they are in the appended claims. These expressions are intended to include other analogous granular material which requires washing and other analogous liquids in which such material can be suspended for washing in accordance with the broad principles of the invention as set forth in the appended claims.

We claim:

1. A device for scrubbing sand suspended in the water of a water filtering sand bed comprising a plurality of tubular shells submerged in said water above the normal level of the sand bed but below the level of said bed when expanded by rising wash water, said shells being arranged in converging relation with their adjacent and remote ends open, a nozzle for introducing into the shells jets of fluid directed toward said adjacent ends of the shells so that said jets will aspirate sand suspended in water in said expanded bed through the shells from the remote ends thereof and project said sand suspended in water through said adjacent ends of the shells in oppositely moving colliding streams, whereby the grains of sand suspended in said streams will be brought into mutually rubbing relation, thereby separating adherent impurities from said grains.

2. A device for scrubbing sand suspended in the water of a water filtering sand bed comprising a fluid induction pipe, a plurality of branches connected thereto and having outlet openings submerged in said water above the normal level of the sand bed but below the level of said bed when expanded by rising wash water, said shells being in opposed relation and in such close proximity to each other that fluid from the outlets will form oppositely moving mutually colliding streams in said water, and means for forcing fluid through the pipe and the branch outlet openings whereby sand suspended in water in said expanded bed will be entrained in the colliding streams and the grains thereof will be brought into mutually rubbing relation, thereby separating adherent impurities from said grains.

3. A device for scrubbing sand suspended in the water of a water filtering sand bed comprising a fluid induction pipe, a plurality of branches connected thereto and having outlet openings submerged in said water above the normal level of the sand bed but below the level of said bed when expanded by rising wash water, said shells being in opposed relation so that fluid from the outlets will form mutually colliding streams in said water, and a tubular shell open at each end and surrounding the portion of each branch adjacent to the outlet opening thereof, whereby when fluid under pressure is forced through the pipe and the branch outlet openings sand suspended in water in said expanded bed will be aspirated through the shells and entrained in the colliding streams and the grains thereof will be brought into mutually rubbing relation, thereby separating adherent impurities from said grains.

4. Means for removing, from a tank containing a liquid to be filtered and a filter bed of loose granular filtering material, solid impurities trapped in said material comprising a pump, an inlet pipe connected to the pump and to the tank for withdrawing liquid from the tank, nozzles submerged in the liquid in the tank, means mounting said nozzles in opposed relation, a pipe connecting said nozzles with the discharge side of the pump so that the nozzles emit the liquid in the form of mutually colliding streams in which the filtering material is entrained whereby the solids in each stream will strike the solids in another stream and the impurities will be broken up and separated from the filtering material and will be reduced by the impact to finely divided form, and means for removing from the filter bed liquid carrying said finely divided impurities.

5. A method of scrubbing the sand granules of a water filtering sand bed to remove adherent surface coatings from them comprising suspending the granules in water above the normal level of the bed and moving said water in streams entraining separate groups of the granules substantially oppositely against each other so that the granules of said separate groups will forcibly strike each other and the surface coatings will be dislodged from them.

6. A method of removing mud balls suspended in a body of water overlying a granular filter bed for water which comprises directing streams of water in said body carrying said mud balls in suspension in jets substantially oppositely toward each other so that mud balls in one jet impinge against mud balls in another jet and are disintegrated into finely divided form capable of being flushed with the water out of said body, and then flushing out of said body the water carrying the disintegrated mud balls.

7. A method of disintegrating mud balls overlying a granular filter bed for water which comprises directing wash water upwardly through the bed to expand the same and suspend the mud balls in water above the normal level of the bed, and directing streams of said wash water carrying said mud balls in suspension in jets substantially oppositely toward each other so that the mud balls in one jet impinge against the mud balls in another jet and are disintegrated by impact.

8. Apparatus for removing mud balls from the sand bed of a water filtration tank comprising a pair of nozzles mounted in the tank above the normal level of the sand bed and below the normal water level with their outlet ends substantially directly facing each other in such close proximity to each other that jets issuing from the nozzles will collide forcibly with each other, means for pumping fluid through the nozzles to produce jets of water in the tank entraining mud balls therein so that the mud balls in the two jets will strike each other with sufficient force to disintegrate, means for forcing wash water up through the sand bed, and a trough above the level of the nozzles for withdrawing from the tank water containing the disintegrated mud.

ARTHUR O. TOMEK.
     GERARD A. ROHLICH.

REFERENCES CITED

The following references are of record in the file of this patent:

UNITED STATES PATENTS

| Number | Name | Date |
|---|---|---|
| 238,044 | Luckenbach et al. | Feb. 22, 1881 |
| 949,455 | Usher | Feb. 15, 1910 |
| 1,406,340 | Brown | Feb. 14, 1922 |
| 1,422,251 | Billingham | July 11, 1922 |
| 1,748,898 | Peebles | Sept. 25, 1930 |
| 1,935,344 | Andrews et al. | Nov. 14, 1933 |
| 2,122,217 | Sisson | June 28, 1938 |
| 2,199,891 | Martin | May 7, 1940 |
| 2,296,824 | Ashworth | Sept. 29, 1942 |
| 2,309,916 | Palmer | Feb. 2, 1943 |
| 2,309,917 | Palmer | Feb. 2, 1943 |